(12) United States Patent
Urano et al.

(10) Patent No.: US 8,879,019 B2
(45) Date of Patent: Nov. 4, 2014

(54) LIQUID CRYSTAL DISPLAY APPARATUS AND ELECTRONIC EQUIPMENT

(75) Inventors: Nobutaka Urano, Chino (JP); Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 236 days.

(21) Appl. No.: 13/565,103

(22) Filed: Aug. 2, 2012

(65) Prior Publication Data

US 2013/0033656 A1 Feb. 7, 2013

(30) Foreign Application Priority Data

Aug. 4, 2011 (JP) ................................ 2011-170779

(51) Int. Cl.
| | | |
|---|---|---|
| G02F 1/1333 | (2006.01) | |
| G02F 1/1335 | (2006.01) | |
| F21V 8/00 | (2006.01) | |
| G02F 1/1345 | (2006.01) | |

(52) U.S. Cl.
CPC .... *G02F 1/133308* (2013.01); *G02F 1/133615* (2013.01); *G02F 1/13452* (2013.01); *G02F 2001/133317* (2013.01); *G02B 6/0088* (2013.01); *G02F 2001/133322* (2013.01)
USPC ..................... 349/58; 349/62; 349/63; 349/65

(58) Field of Classification Search
USPC ...................................................... 349/58–65
See application file for complete search history.

(56) References Cited

U.S. PATENT DOCUMENTS

| | | | |
|---|---|---|---|
| 8,094,442 B2 | 1/2012 | Sugawara | |
| 8,284,344 B2 * | 10/2012 | Harada | ........................... 349/58 |
| 2005/0099554 A1 * | 5/2005 | Hayano | ........................... 349/58 |
| 2006/0001793 A1 * | 1/2006 | Nitto et al. | ...................... 349/58 |
| 2011/0090422 A1 * | 4/2011 | Hamada | ........................... 349/62 |

FOREIGN PATENT DOCUMENTS

| | | |
|---|---|---|
| JP | A-2008-286977 | 11/2008 |
| JP | A-2010-169906 | 8/2010 |

* cited by examiner

*Primary Examiner* — Huyen Ngo
(74) *Attorney, Agent, or Firm* — Oliff PLC

(57) ABSTRACT

A liquid crystal display apparatus including: a liquid crystal panel which includes a device substrate, a counter substrate arranged to face the device substrate, and a protruded section in which the device substrate protrudes from an end portion of the counter substrate; a lighting system which includes an optical sheet arranged on a side which is opposite a light emission side of the liquid crystal panel; and a first frame portion which supports an edge of the protruded section of the device substrate and includes a protruded plate section that protrudes between the device substrate and the optical sheet, wherein the first frame portion includes a first stage section which faces a side end surface of the device substrate and a second stage section which is arranged between an edge of the protruded plate section and the first stage and which faces an outline side of the optical sheet.

10 Claims, 7 Drawing Sheets

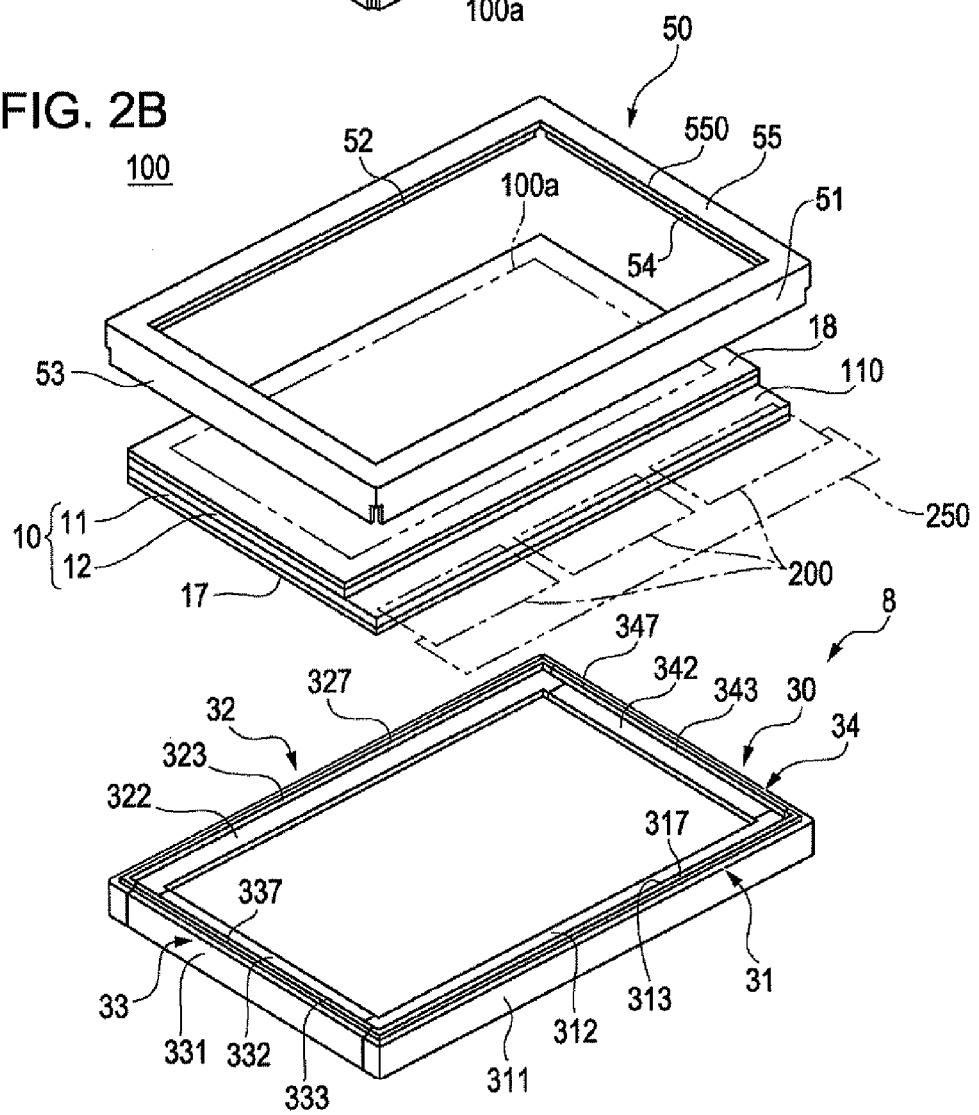

LIQUID CRYSTAL DISPLAY APPARATUS AND ELECTRONIC EQUIPMENT

BACKGROUND

1. Technical Field

The present invention relates to a liquid crystal display apparatus which holds a liquid crystal panel and an optical sheet arranged to be overlapped on the liquid crystal panel using a frame, and electronic equipment which includes the liquid crystal display apparatus.

2. Related Art

A liquid crystal display apparatus having a transparent liquid crystal panel includes a lighting system which is arranged to be overlapped on the liquid crystal panel. The lighting system includes an optical sheet, such as a prism sheet or the like, which is arranged to be overlapped on the liquid crystal panel.

The lighting system includes a light guide plate and light-emitting elements which face a light-emitting section on the side end surface of the light guide plate. In the liquid crystal display apparatus including the lighting system, the liquid crystal panel is interposed between a protruded plate section of a first frame and a second frame, and the optical sheet is interposed between the protruded plate section and the light guide plate. In addition, the optical sheet is arranged such that the outline side (outer edge) thereof is located further to the inner side than the end portion of the liquid crystal panel (for example, refer to JP-A-2008-286977).

Meanwhile, another type of lighting system is provided with a fluorescent tube which is arranged immediately below the liquid crystal panel. In a liquid crystal display apparatus including the lighting system, a liquid crystal panel is interposed between the protruded plate section of a first frame and a second frame, and an optical sheet is interposed between the protruded plate section and a reflector (for example, refer to JP-A-2010-169906).

Among liquid crystal display apparatuses having the above-described configuration, the liquid crystal display apparatus disclosed in JP-A-2008-286977 includes the first frame provided with stage sections which protrude from the protruded plate section toward the side of the optical sheet, which faces the outline side of the optical sheet. According to this configuration, it is possible to suppress the positional aberration of the optical sheet to some extent using the stage sections, so that it is possible for the outline side of the optical sheet to be arranged to be located further to the inner side than the end portion of the liquid crystal panel.

Meanwhile, the liquid crystal display apparatus disclosed in JP-A-2010-169906 includes a first frame which is provided with stage sections which protrude from a protruded plate section toward the side of the liquid crystal panel and which face the outline side of the liquid crystal panel. According to this configuration, it is possible to prevent the positional aberration of the liquid crystal panel from being generated using the stage sections. In addition, the first frame is also provided with stage sections which protrude from the protruded plate section toward the side of the optical sheet and which face the outline side of the optical sheet. According to this configuration, it is possible to prevent the positional aberration of the optical sheet from being generated using the stage sections, so that it is possible for the outline side of the optical sheet to be arranged to be located further to the inner side than the end portion of the liquid crystal panel.

However, the configuration related to the stage sections disclosed in JP-A-2008-286977 and JP-A-2010-169906 are related to positions in which the end portion of the counter substrate is overlapped on the end portion of the device substrate of the outline side of the liquid crystal panel, and the configuration of the side of the device substrate where the protruded section which protrudes from the end portion of the counter substrate is not disclosed in JP-A-2008-286977 and JP-A-2010-169906 at all. Here, on the side, on which the protruded section is located, the edge of the liquid crystal panel (the side end surface of the device substrate) is greatly separated from an image display region, so that, if the configuration of the related portion is not optimized, the size of the optical sheet is excessively large compared to the size of the image display region, thereby increasing the costs of the optical sheet. In addition, the protruded section does not have a panel structure nor a counter substrate, so that, if an impact is applied to the liquid crystal panel by an external force and the liquid crystal panel is heavily struck on the periphery, the device substrate is distorted and image irregularity or damage to the device substrate may be generated.

SUMMARY

An advantage of some aspects of the invention is to provide a liquid crystal display apparatus which can prevent the positional aberrations of a liquid crystal panel and an optical sheet from being generated and can reduce the optical sheet to a minimum size by adjusting the configuration of a side on which the protruded section of the device substrate of the liquid crystal panel is located.

According to an aspect of the invention, there is provided a liquid crystal display apparatus including: a liquid crystal panel which includes a device substrate, counter substrate arranged to face the device substrate, a frame-shaped seal material configured to bond the device substrate to the counter substrate, a liquid crystal layer interposed between the device substrate and the counter substrate in a region surrounded by the seal material, and a protruded section in which the device substrate protrudes from an end portion of the counter substrate; a lighting system which includes an optical sheet arranged to be overlapped on a side which is opposite a light emission side of the liquid crystal panel; and a first frame portion which supports an edge of the protruded section of the element substrate and includes a protruded plate section that protrudes between the protruded section of the element substrate and the optical sheet. The first frame portion is provided with a first surface as a first stage section which faces a side end surface of the device substrate and with a second surface as a second stage section which is arranged between an edge of the protruded plate section and the first stage in a plane view from a normal direction of a surface of the liquid crystal panel and which faces an outline side of the optical sheet. At this time, it is preferable that the first frame portion be a part of a frame which supports edges of the liquid crystal panel.

In the aspect of the invention, the side of the device substrate, on which the protruded section which protrudes from the end portion of the counter substrate is located, is provided with the first stage section (first surface), which protrudes from the protruded plate section of the first frame portion toward the side of the liquid crystal panel and faces the side end surface of the protruded section, and the liquid crystal panel is supported using the protruded plate section. Therefore, even if an impact is applied to the liquid crystal panel by external force, the liquid crystal panel is not heavily struck on the first stage section (first surface). Therefore, even though the side on which the protruded section is located does not have a panel structure, it is possible to prevent the device substrate from being distorted, prevent image irregularity from being generated, and prevent damage to the device substrate from being generated. In addition, the side, on which the protruded section is located, is provided with the second stage section (second surface) which protrudes from the protruded plate section of the first frame portion toward the optical sheet and faces the outline side of the optical sheet. Therefore, even in a case where the positional aberration of the optical sheet may be generated due to external force, the optical sheet abuts against the second stage section (second surface) and the position thereof is not changed any further. Therefore, it is possible to prevent the optical sheet from being distorted and prevent image irregularity from being generated. In addition, even when the positional aberration of the optical sheet might be generated, the optical sheet abuts against the second stage section (second surface), so that the position thereof is not changed any further. Therefore, even when the second stage section is arranged on more inner side than the first stage section (first surface) and the size of the optical sheet is reduced, there is not a case where light is incident upon the liquid crystal panel without passing through the optical sheet. In addition, since the first frame portion is used as a part of the frame which supports the edges of the liquid crystal panel, it is possible to hold the liquid crystal panel using the entire frame.

It is preferable that the lighting system include: a light guide plate arranged to be overlapped with the optical sheet on a side which is opposite the liquid crystal panel with respect to the optical sheet, and configured to include at least a part of a region of the light guide plate which is overlapped on the protruded plate section in the plane view from the normal direction of the surface of the liquid crystal panel and which is abutted against the first frame portion; and light-emitting elements arranged along at least a side end surface of the light guide plate.

It is preferable that the second stage section (second surface) be located between the side end surface of the light guide plate and the edge of the protruded plate section in the plane view from the normal direction of the surface of the liquid crystal panel. According to this configuration, since the size of the optical sheet is small, it is possible to reduce the costs.

It is preferable that the liquid crystal panel be interposed between a second frame, arranged on a side which is opposite the protruded plate section with respect to the liquid crystal panel, and the protruded plate section, and the optical sheet be interposed between the light guide plate and the protruded plate section.

It is preferable that, on the side, on which the protruded section is located, an outline side of the optical sheet be located at a position which is overlapped on a side end surface of the counter substrate, or located further to an inner side of the counter substrate than the side end surface of the counter substrate in the plane view from the normal direction of the surface of the liquid crystal panel. According to this configuration, since the size of the optical sheet is small, it is possible to reduce the costs.

It is preferable that, on the side, on which the protruded section is located, the edge of the protruded plate section be located further to an inner side of the liquid crystal panel than the seal material in the plane view from the normal direction of the surface of the liquid crystal. According to this configuration, it is possible to reliably hold the liquid crystal panel and the optical sheet. In addition, the inner edge of the protruded plate section can be used as a border or a part of the border.

It is preferable that, on the side, on which the protruded section is located, a gap be provided between an outline side of the optical sheet and the second surface as the second stage section. According to this configuration, the variation in the position of the outline side of the optical sheet is permitted to some extent, so that it is possible to prevent the optical sheet from being bent.

It is preferable that a gap be provided between the side end surface of the device substrate and the first surface as the first stage section. According to this configuration, even when an impact is applied to the first frame portion, a large amount of load is not applied to the liquid crystal panel, so that it is possible to prevent the device substrate from being distorted, prevent image irregularity from being generated, and prevent the device substrate from being damaged.

The liquid crystal display apparatus according to the aspect of the invention may be used for electronic equipment such as a liquid crystal TV.

BRIEF DESCRIPTION OF THE DRAWINGS

The invention will be described with reference to the accompanying drawings, wherein like numbers reference like elements.

FIGS. 2A and 2B are explanatory views illustrating the entire configuration of the liquid crystal display apparatus according to the first embodiment of the invention.

DESCRIPTION OF EXEMPLARY EMBODIMENTS

Figure 1A:
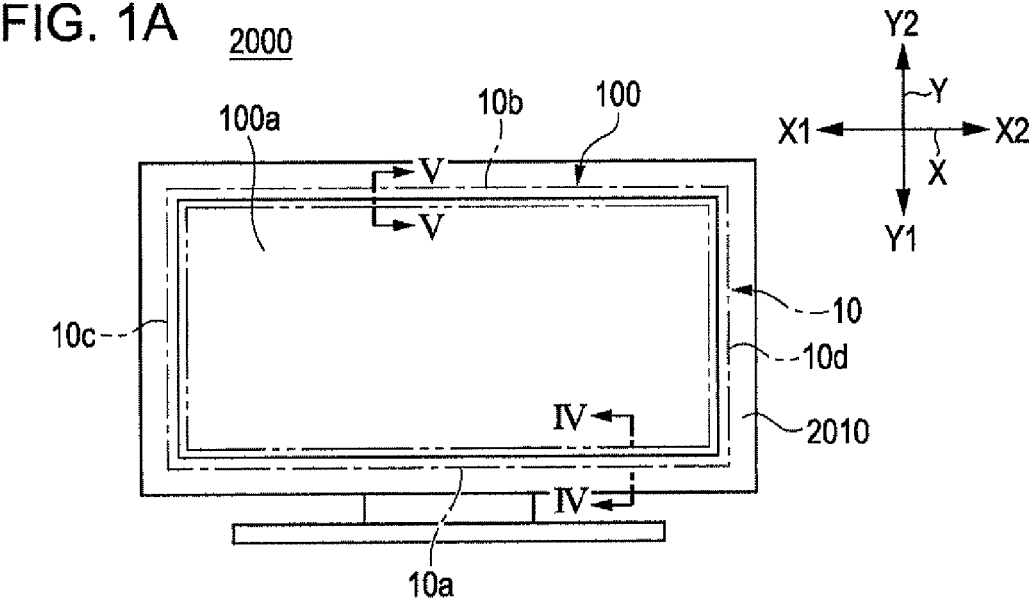
FIGS. 1A and 1B are explanatory views illustrating a liquid crystal Television (TV) (electronic equipment) including a liquid crystal display apparatus according to a first embodiment of the invention.

Embodiments of the invention applied to a liquid crystal display apparatus for a liquid crystal TV will be described with reference to the accompanying drawings. Meanwhile, in the drawings which are referred to in the description below, the dimensions of each layer or each member are altered in order to illustrate each layer or each member in a size which can be recognized in the drawing. In addition, in the description below, one of the directions which intersect each other in the in-plane direction of a light guide plate or a liquid crystal panel (the direction in which the long side of the light guide plate or the liquid crystal panel (display panel) extends in the drawing) is set to an X-axis direction, and the other direction (the direction in which the short side of the light guide plate or the liquid crystal panel extends in the drawing) is set to a Y-axis direction, and the direction which intersects to the X-axis direction and the Y-axis direction (the direction in which the light guide plate and the liquid crystal panel are laminated in the drawing) is set to a Z-axis direction. In addition, the drawings which are referred to below are illustrated such that one side of the X-axis direction is set to an X1 side, the other side is set to an X2 side, one side of the Y-axis direction (the direction in which the protruded section of the liquid crystal panel is arranged) is set to a Y1 side, the other side which faces the Y1 side is set to a Y2 side, one side of the Z-axis direction (the direction which faces the rear surface of the light guide plate) is set to a Z1 side (lower side), and the other side which faces the Z1 side (the side from which illuminating light or display light is emitted) is set to a Z2 side (upper side).

First Embodiment

Entire Configuration

Figure 1B:
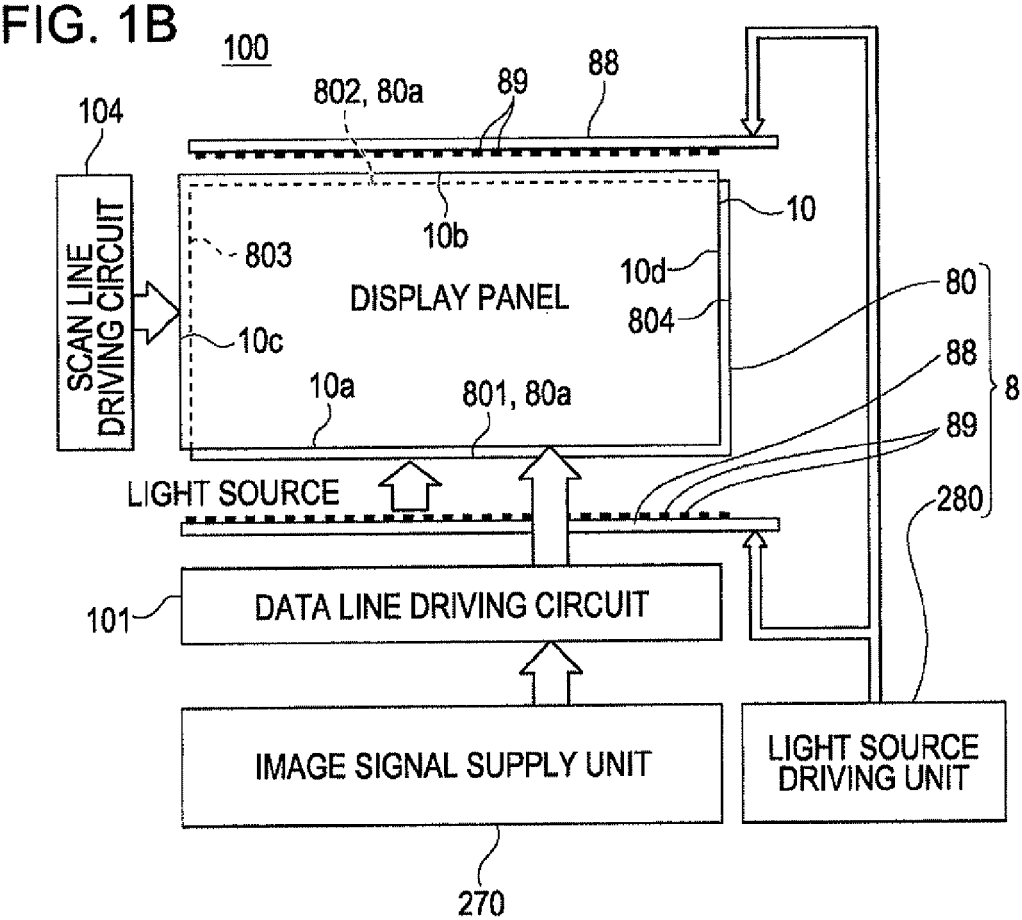

FIGS. 1A and 1B are explanatory views illustrating a liquid crystal TV (electronic equipment) including a liquid crystal display apparatus according to a first embodiment of the invention. FIG. 1A is an explanatory view schematically illustrating the external appearance of the liquid crystal TV and FIG. 1B is a block diagram illustrating the electrical configuration of the liquid crystal display apparatus.

An electronic equipment 2000 shown in FIG. 1A is a liquid crystal TV, and includes a liquid crystal display apparatus 100, a TV frame 2010, or the like. The liquid crystal display apparatus 100 includes a liquid crystal panel 10 (display panel) which will be described later, an image signal supply unit 270 which supplies an image signal to the liquid crystal panel 10, and a lighting system 8 which supplies illuminating light to the liquid crystal panel 10. In addition, the liquid crystal display apparatus 100 includes a scan line driving circuit 104 which drives scan lines extended in the X-axis direction of the liquid crystal panel 10, and a data line driving circuit 101 which drives data lines extended in the Y-axis direction of the liquid crystal panel 10. A configuration, in which both the scan line driving circuit 104 and data line driving circuit 101 are mounted in the liquid crystal panel 10, can be used. In addition, a configuration, in which one of the scan line driving circuit 104 and the data line driving circuit 101 is mounted in the liquid crystal panel 10 and the other one is mounted in a driving Integrated Circuit (IC) which is mounted in the liquid crystal panel 10 in COG manner, can be used. In addition, a configuration, in which one of the scan line driving circuit 104 and the data line driving circuit 101 is mounted in the liquid crystal panel 10 and the other one is mounted in a driving IC which is mounted in a circuit substrate which is electrically connected to the liquid crystal panel 10, can be used. Furthermore, a configuration, in which both the scan line driving circuit 104 and the data line driving circuit 101 are mounted in a driving IC which is separated from the liquid crystal panel 10, can be used.

In the first embodiment, the lighting system 8 includes a light guide plate 80 which is arranged to be overlapped on the liquid crystal panel 10, a plurality of light-emitting elements 89 which are arranged along the side end surfaces provided as light incidence sections 80a of the side end surface of the light guide plate 80, light source substrates 88 on which the plurality of light-emitting elements 89 are mounted, and a light source driving unit 280 which drives the light-emitting elements 89. In the first embodiment, the liquid crystal panel 10 is a horizontally long rectangle, and includes four sides 10a, 10b, 10c, and 10d on the edge thereof. The side 10a of the sides 10a, 10b, 10c, and 10d is a long side located in one side Y1 of the Y-axis direction, the side 10b is a long side located in the other side Y2 of the Y-axis direction, the side 10c is a short side located in one side X1 of the X-axis direction, and the side 10d is a short side located in the other side X2 of the X-axis direction. With respect to the shape, the light guide plate 80 includes four side end surfaces 801, 802, 803, and 804. Among these side end surfaces 801 to 804, the side end surface 801 is located on the long side of the one side Y1 of the Y-axis direction, the side end surface 802 is located on the long side of the other side Y2 of the Y-axis direction, the side end surface 803 is located on the short side of the one side X1 of the X-axis direction, and the side end surface 804 is located on the short side of the other side X2 of the X-axis direction. In the first embodiment, among the four side end surfaces 801, 802, 803, and 804 of the light guide plate 80, the two side end surfaces 801 and 802, which face each other in the short side direction (Y-axis direction), function as the light incidence sections 80a. Therefore, the light-emitting elements 89 are arranged along each of the two side end surfaces 801 and 802 (light incidence sections 80a) of the light guide plate 80, and the light source substrates 88 are extended along the respective two side end surfaces 801 and 802 (the light incidence sections 80a) of the light guide plate 80.

Detailed Configuration of Liquid Crystal Display Apparatus 100

Figure 3:
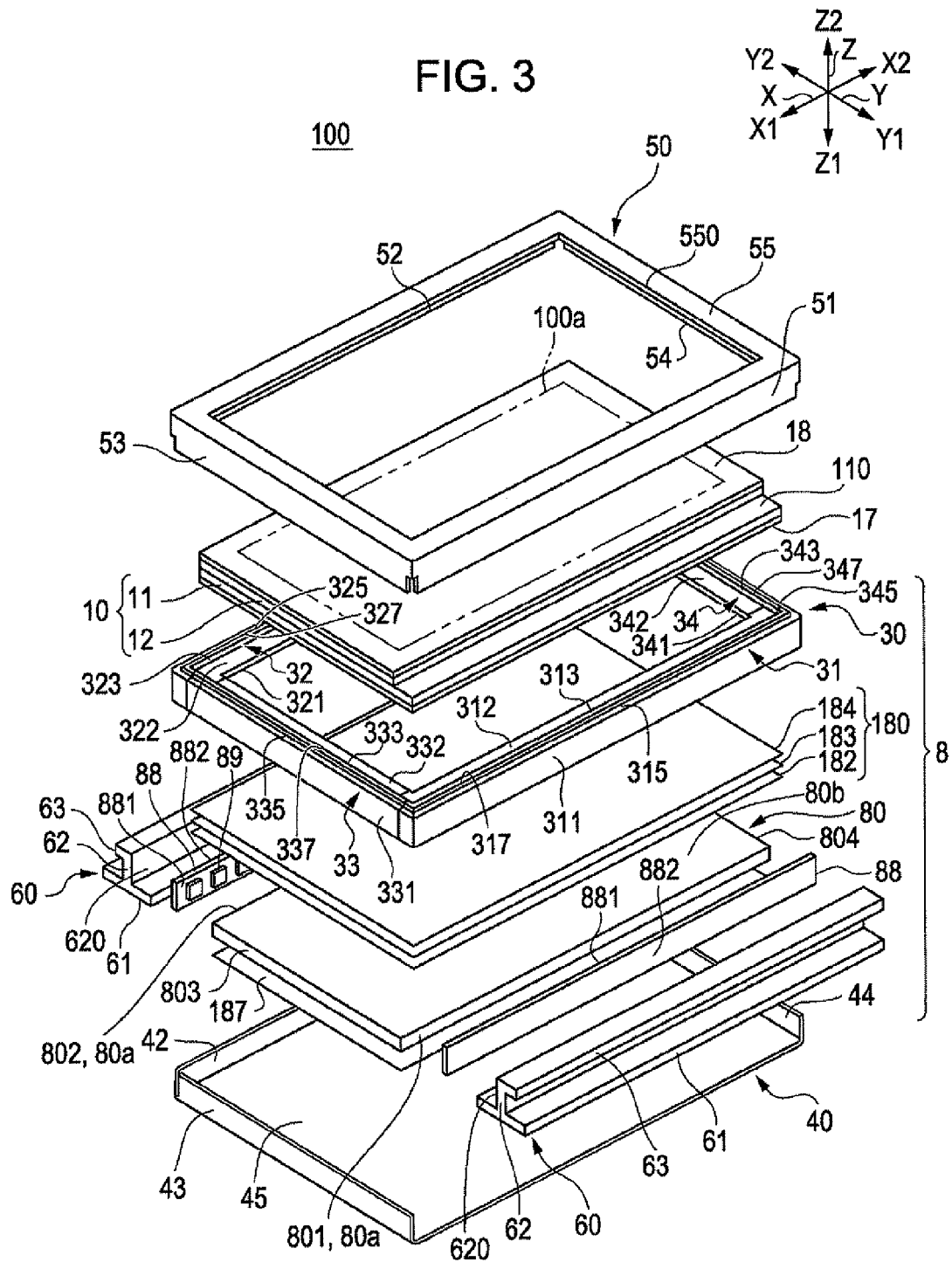
FIG. 3 is an exploded perspective view illustrating a case where the liquid crystal display apparatus is further resolved according to the first embodiment of the invention.
Figure 4A:
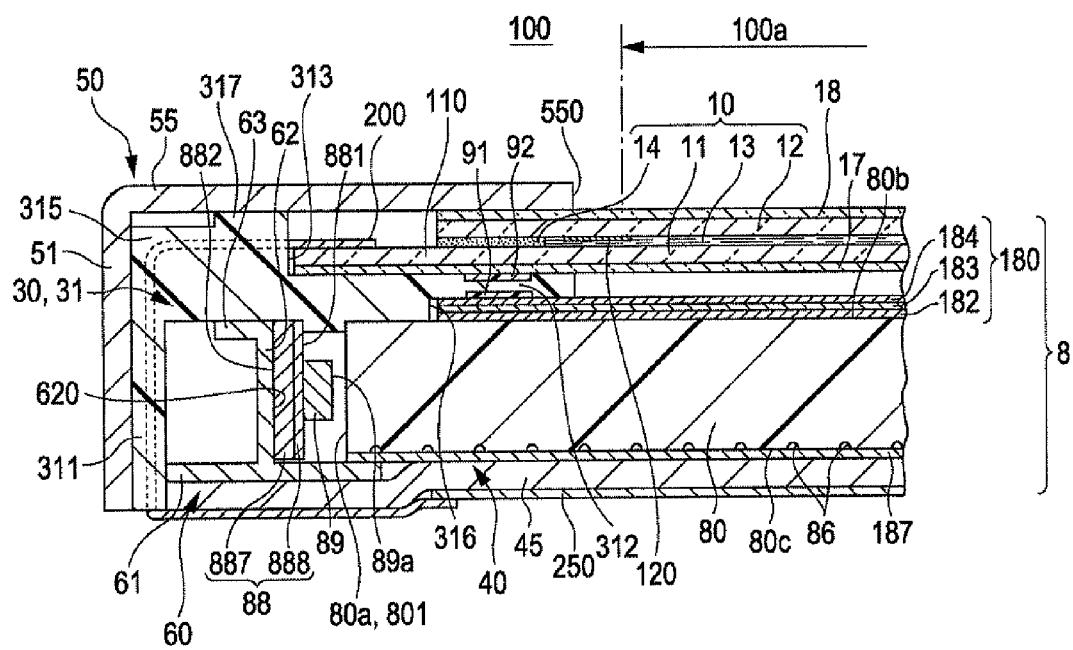
FIGS. 4A and 4B are cross-sectional views illustrating the side of the liquid crystal display apparatus on which a protruded section is located according to the first embodiment of the invention.
Figure 4B:
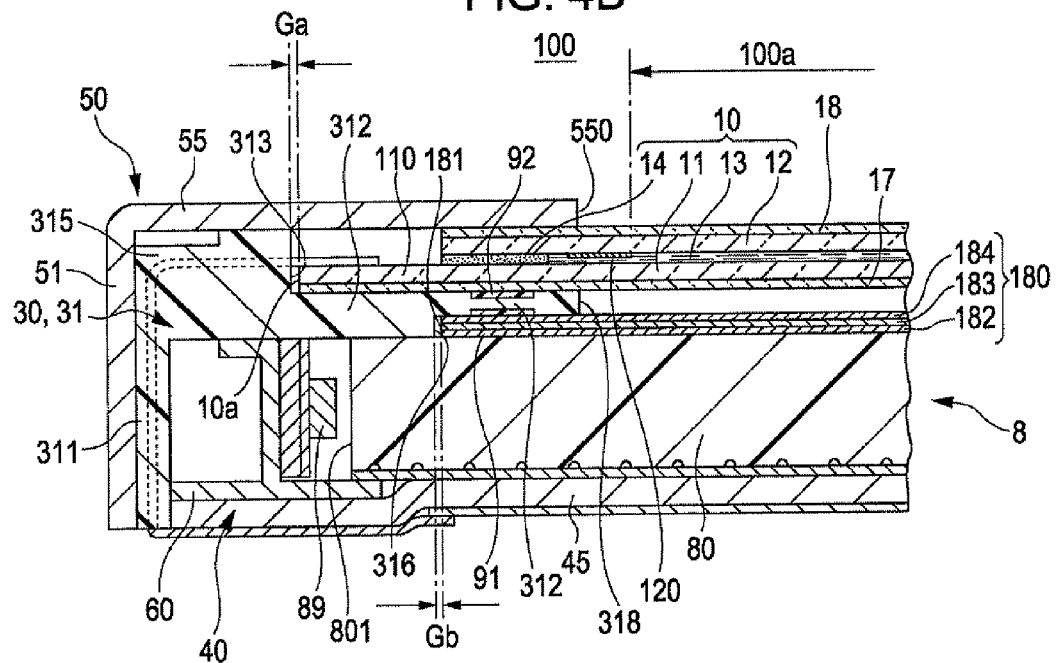
Figure 5A:
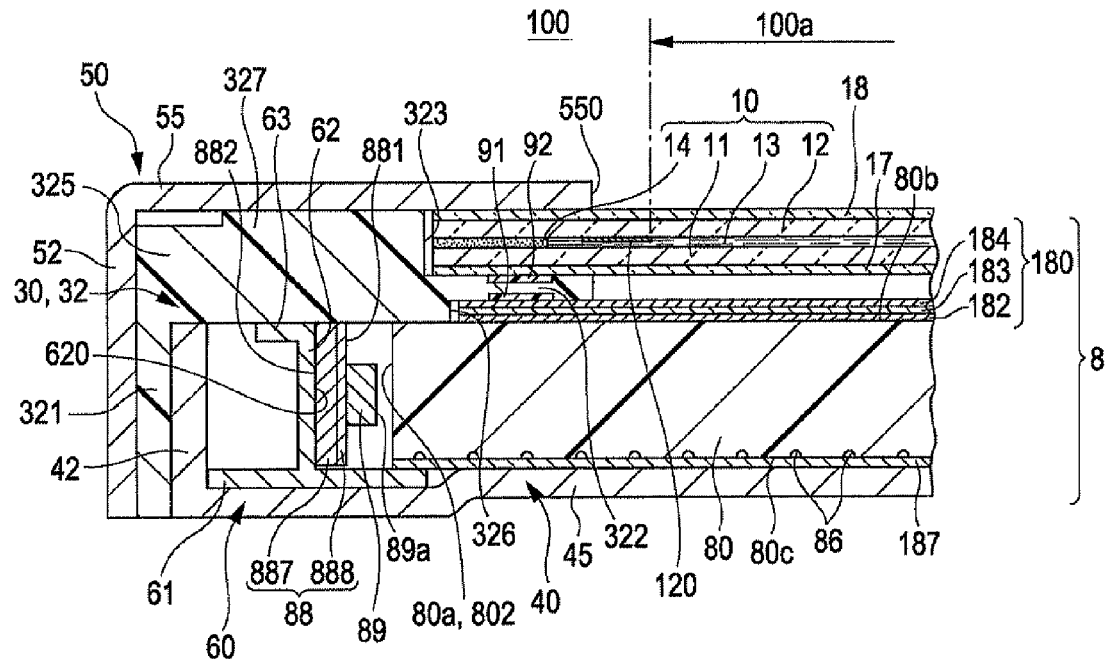
FIGS. 5A and 5B are cross-sectional views illustrating a side which is opposite the side of the liquid crystal display apparatus on which the protruded section is located according to the first embodiment of the invention.
Figure 5B:
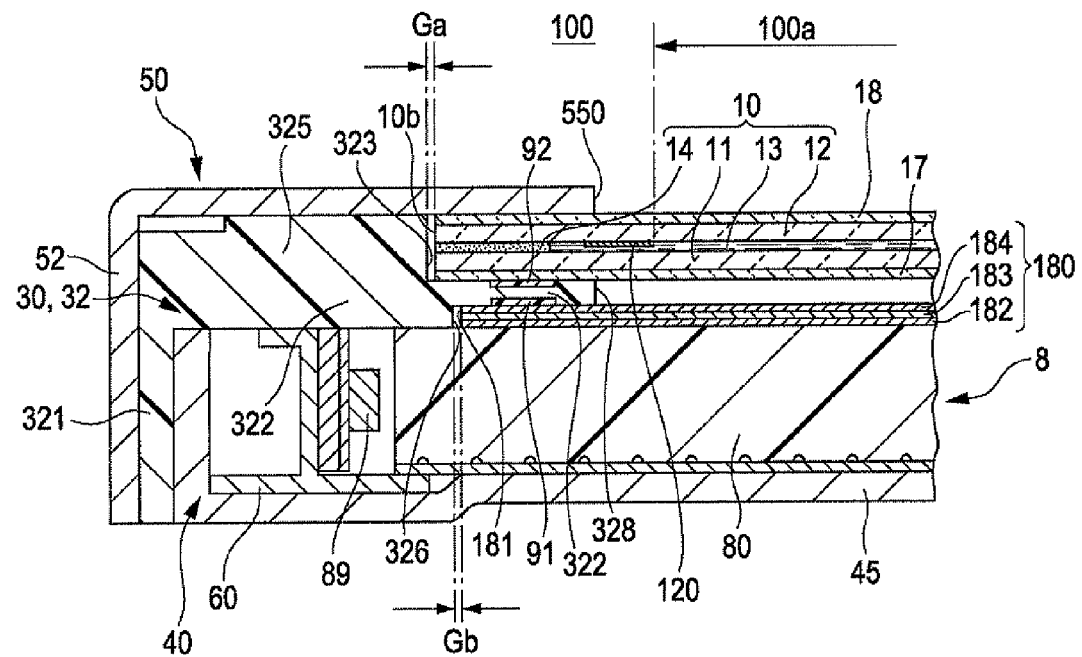

FIGS. 2A and 23 are explanatory views illustrating the entire configuration of the liquid crystal display apparatus 100 according to the first embodiment of the invention. FIG. 2A is a perspective view illustrating the liquid crystal display apparatus 100 and FIG. 2B is an exploded perspective view illustrating the liquid crystal display apparatus 100. FIG. 3 is an exploded perspective view illustrating a case where the liquid crystal display apparatus 100 is further finely resolved according to the first embodiment of the invention. FIGS. 4A and 4B are cross-sectional views illustrating the side of the liquid crystal display apparatus 100, in which a protruded section is located, according to the first embodiment of the invention (cross-sectional views taken along IVA-IVA and IVB-IVB of FIG. 1A). FIG. 4A is a cross-sectional view illustrating the general configuration of the side in which the protruded section is located, and FIG. 4B is an explanatory view illustrating the gap around the protruded plate section. FIGS. 5A and 5B are cross-sectional views illustrating a side which is opposite the side of the liquid crystal display apparatus 100, in which the protruded section is located, according to the first embodiment of the invention (cross-sectional views taken along VA-VA and VB-VB of FIG. 1A). FIG. 5A is a cross-sectional view illustrating the general configuration of the side which is opposite the side in which the protruded section is located, and FIG. 5B is an explanatory view illustrating the gap around the protruded plate section. Meanwhile, in the case in which FIGS. 4A and 4B and FIGS. 5A and 5B are referred to, FIGS. 4A and 5A are referred to when the general configuration of the liquid crystal display apparatus 100 is illustrated and FIGS. 4B and 5B are referred to when the gap provided around the protruded plate section is illustrated.

In FIGS. 2A and 2B, FIG. 3, and FIGS. 4A and 5A, the liquid crystal display apparatus 100 according to the first embodiment generally includes a lighting system 8 which is a so-called backlight apparatus, and a transparent liquid crystal panel 10 which is arranged to be overlapped on the upper surface of the lighting system 8. In the liquid crystal display apparatus 100, the lighting system 8 includes a metallic third frame 40 (lower metallic frame) which is arranged to cover the rear surface of the light guide plate 80 on a lower side (one side Z1 of the Z-axis direction), a resinous first frame 30 (resin frame) which holds the end portion of the liquid crystal panel 10 on the upper side of the third frame 40 and holds the lighting system 8 by surrounding the lighting system 8, and a metallic second frame 50 (upper metallic frame) which is arranged on the upper side (the other side Z2 of the Z-axis direction) of the first frame 30.

The first frame 30 has a rectangular frame shape which surround the circumference of the liquid crystal panel 10 while holding the end portion of the liquid crystal panel 10. In the first embodiment, the first frame 30 includes four frame plates (first frame portions) 31, 32, 33, and 34 which are divided as four sides corresponding to the four sides of the liquid crystal panel 10. In the first embodiment, the first frame 30 is black color and functions as a light absorption member, thereby preventing stray light from being generated in the lighting system 8. The frame plates (first frame portions) 31, 32, 33, and 34 respectively include side plate sections 311, 321, 331, and 341 which extend in the lower direction on the external surface sides of the frame plates (first frame portions) 31, 32, 33, and 34, upper plate sections 315, 325, 335, and 345 (end plate sections) which are bent from the upper end edges of the side plate sections 311, 321, 331, and 341 toward the inner side, and protruded plate sections 312, 322, 332, and 342 which protrude from the intermediate position toward the inside in the thickness directions (in the Z-axis direction of the side plate sections) of the upper plate sections 315, 325, 335, and 345.

In addition, on the upper surfaces of the upper plate sections 315, 325, 335, and 345, convex sections 317, 327, 337, and 347 are formed. Therefore, first stage sections (first surfaces) 313, 323, 333, and 343 are formed between the protruded plate sections 312, 322, 332, and 342 and the convex sections 317, 327, 337, and 347, which are inside the frame plates (first frame portions) 31, 32, 33, and 34, in the thickness direction (in the Z-axis direction of the side plate sections). The position of the in-plane direction of the liquid crystal panel 10 is defined by the first stage sections (first surfaces) 313, 323, 333, and 343 and the protruded plate sections 312, 322, 332, and 342. In addition, on the lower sides of the protruded plate section 312, the light guide plate 80, the light-emitting elements 89, and the like which are included in the lighting system 8 are arranged. Here, the first frame 30 is formed with second stage sections (second surfaces) 316 and 326 which are protruded toward the lighting system 8 from the protruded plate sections 312 and 322. By the second stage sections (second surfaces) 316 and 326, the position of the in-plane direction of the optical sheet 180 which will be described later is defined. In addition, although not shown in the drawing, like the protruded plate sections 312 and 322, the second stage sections (second surfaces) which are protruded toward the lighting system 8 are formed from the protruded plate sections 332 and 342 in the first frame 30. By the second stage sections (second surfaces), the position of the in-plane direction of the optical sheet 180 which will be described later is defined.

The third frame 40 is formed using a press processing or the like which is performed on a thin metal plate such as an SUS plate or the like. The third frame 40 includes a lower plate section 45, and three side plate sections 42, 43, and 44 which respectively rise from three sides excluding one side Y1 of the Y-axis direction among the outer circumference edges of the lower plate section 45. The shape of the third frame 40 is a rectangular box the upper surface of which is open. The side plate sections 321, 331, and 341 of the first frame 30 are overlapped on the external sides of the side plate sections 42, 43, and 44 of the third frame 40. In addition, the side plate section 311 of the first frame 30 covers the end portion (end portion which does not have the side plate section) of the third frame 40 in the one side Y1 of the Y-axis direction.

Like the third frame 40, the second frame 50 is also formed using a press processing or the like which is performed on a thin metal plate such as an SUS plate or the like. The second frame 50 includes a rectangular upper plate section 55 (end plate section), and four side plate sections 51, 52, 53, and 54 which are curved downward from the outer circumference edges of the upper plate section 55. The shape of the second frame 50 is a rectangular box the lower surface of which is open. The side plate sections 51, 52, 53, and 54 are overlapped on the external sides of the side plate sections 311, 321, 331, and 341 of the first frame 30. The upper plate section 55 is formed with a rectangular window 550 which corresponds to an image display region 100a which emits light emitted from the liquid crystal panel 10. The upper plate section 55 covers the entire circumference of the external end portion of the display light emission side of the liquid crystal panel 10.

Configuration of liquid crystal panel 10

As shown in FIGS. 2A and 2S, FIG. 3, and FIGS. 4A and 5A, the liquid crystal panel 10 has the shape of plane rectangle, and includes a device substrate 11 on which pixel electrodes (not shown in the drawing) or the like are formed, a counter substrate 12 which is arranged to be opposite the device substrate 11 through a predetermined gap, and a rectangular seal material 14 which bonds the counter substrate 12 and the device substrate 11. In the liquid crystal panel 10, a liquid crystal layer 13 is held in the region, surrounded by the seal material 14, between the device substrate 11 and the counter substrate 12. The device substrate 11 and the counter substrate 12 are formed of a translucent substrate such as a glass substrate or the like. In the device substrate 11, a plurality of scan lines (not shown in the drawing) are extended in the X-axis direction. Meanwhile, a plurality of data lines are extended in the Y-axis direction, and switching elements (not shown in the drawing) and pixel electrodes are provided so as to correspond to the intersections of the scan lines and the data lines (not shown in the drawing).

In the first embodiment, the counter substrate 12 is arranged on the display light emission side, and the device substrate 11 is arranged on the side of the lighting system 8. In addition, on the surface of the counter substrate 12 which faces the device substrate 11, a picture frame layer 120 including a rectangular light shielding layer is formed along the inner edges of the four sides of the seal material 14. The region defined by the inner edges of the picture frame layer 120 is an image display region 100a. Meanwhile, the inner edges of the upper plate section 55 of the second frame 50 are arranged in the intermediate positions of the picture frame layer 120 which includes a light shielding layer in the width direction. The window 550 of the second frame 50 is overlapped on the inner circumference portions of the image display region 100a and the picture frame layer 120.

The liquid crystal panel 10 is configured as a liquid crystal panel which is formed in a Twisted Nematic (TN) manner, an Electrically Controlled Birefringence (ECB) manner, or a Vertical Aligned Nematic (VAN) manner. The pixel electrodes are formed on the device substrate 11 and a common electrode (not shown in the drawing) is formed on the counter substrate 12. Meanwhile, when the liquid crystal panel 10 is a liquid crystal panel which is formed in an In-Plane Switching (IPS) manner or a Fringe Field Switching (FFS) manner, the common electrode is provided on the side of the device substrate 11. In addition, the device substrate 11 may be arranged on the display light emission side with respect to the counter substrate 12. An upper polarization plate 18 is arranged to be overlapped on the upper surface of the liquid crystal panel 10, and a lower polarization plate 17 is arranged between the lower surface of the liquid crystal panel 10 and the lighting system 8.

In the first embodiment, the device substrate 11 is larger than the counter substrate 12. Therefore, the device substrate 11 includes the protruded section 110 which protrudes from the end portion of the counter substrate 12 in the one side Y1 of the Y-axis direction. A plurality of flexible wiring substrates 200 are connected to the upper surface of the protruded section 110. The flexible wiring substrates 200 are connected to a circuit substrate 250 which includes a rigid substrate. A control IC (not shown in the drawing) which is included in the image signal supply unit 270 described with reference to FIGS. 1A and 1B, and a light source driving IC (not shown in the drawing) which is included in the light source driving unit 280 are mounted on the circuit substrate 250.

Configuration of Lighting System 8

Figure 6A:
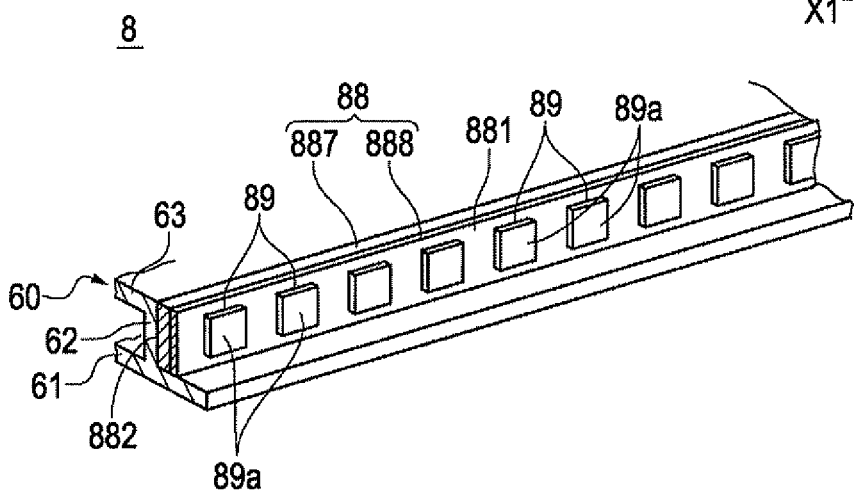
FIGS. 6A and 6B are explanatory views illustrating the configuration of the circumference of the light source substrate of the lighting system of the liquid crystal display apparatus according to the first embodiment of the invention.
Figure 6B:
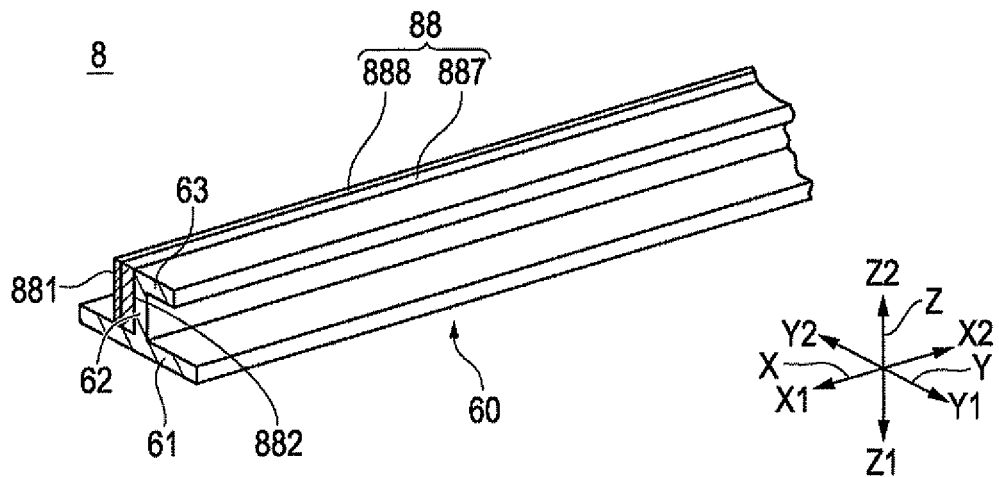

FIGS. 6A and 6B are explanatory views illustrating the configuration of the circumference of the light source substrate 88 used for the lighting system 8 of the liquid crystal display apparatus 100 according to the first embodiment of the invention. FIG. 6A is an explanatory view schematically illustrating the shape of one surface 881 of the light source substrate 88, and FIG. 6B is an explanatory view schematically illustrating on the shape of the other surface 882 of the light source substrate 88. Meanwhile, the configurations of the light-emitting elements 89 and the light source substrate 88, which are arranged on the two side end surfaces 801 and 802 (light incidence sections 80*a*) of the light guide plate 80 which face each other in the Y-axis direction, are the same. Therefore, FIG. 6A illustrates the light-emitting elements 89 and the light source substrate 88 which are arranged on the side end surface 802 of the light guide plate 80, and FIG. 6B illustrates the light source substrate 88 or the like which is arranged on the side end surface 801 of the light guide plate 80.

As shown in FIGS. 3, 4A, and 5A, the lighting system 8 includes the light guide plate 80 which is arranged to be overlapped on the lower surface side of the liquid crystal panel 10, and the plurality of light-emitting elements 89 which are arranged in the light incidence sections 80*a* of the light guide plate 80 toward the light-emitting surfaces 89*a* from one end side (one side X1 of the X-axis direction) to the other end side (the other side X2 of the X-axis direction) of the light incidence sections 80*a*. In the first embodiment, the plurality of light-emitting elements 89 are mounted on one surface 881 of the light source substrate 88 which is extended in the X-axis direction along the light incidence sections 80*a*. The light-emitting elements 89 are Light Emitting Diodes (LEDs) which emit white light, and emit source light as diverging light.

In the lighting system 8 according to the first embodiment, among the side end surfaces 801, 802, 803, and 804 of the light guide plate 80, the two side end surfaces 801 and 802 which face with each other in the Y-axis direction are used as the light incidence sections 80*a*. Therefore, the plurality of light-emitting elements 89 are arranged from one end side to the other end side of each of the two light incidence sections 80*a* (side end surfaces 801 and 802) toward the light-emitting surfaces 89*a* of each of the two light incidence sections 80*a* (side end surfaces 801 and 802) of the light guide plate 80. In addition, two light source substrates 88 are extended along the two light incidence sections 80*a* (side end surfaces 801 and 802), and the plurality of light-emitting elements 89 are mounted on one side surface 881 of each of the two light source substrates 88.

In the first embodiment, the light guide plate 80 is a translucent resin plate which is formed of acrylic resin, polymethylstyrene resin, polycarbonate resin, or the like. A reflection sheet 187 is arranged to be overlapped on between the lower surface 80*c* (surface which is opposite the light-emitting surface 80*b*/opposite surface) of the light guide plate 80 and the lower plate section 45 of the third frame 40. The resin plate used for the light guide plate 80 is formed by extrusion molding, injection molding, or the like.

In addition, an optical sheet 180, including a diffusion sheet 182, prism sheets 183 and 184, and the like, is arranged to be overlapped on between the upper surface (light-emitting surface 80*b*) of the light guide plate 80 and the liquid crystal panel 10. The diffusion sheet 182 is formed of a sheet which includes a coating layer in which silica particles or the like are dispersed on a translucent resin such as acrylic resin, polycarbonate resin, or the like. In the first embodiment, two pieces of prism sheets 183 and 184 are arranged such that the ridge lines are perpendicular to each other. Therefore, after illuminating light emitted from the light-emitting surface 80*b* of the light guide plate 80 is dispersed in all direction using the diffusion sheet 182, directivity having a peak is granted in the frontal direction of the liquid crystal panel 10 using the two pieces of prism sheets 183 and 184.

In the light guide plate 80, a plurality of grooves 86 which include linear minute concaves extended in the x-axis direction are formed as a diffusion pattern on the lower surface 80*c* on which a reflection sheet 187 is located. In the first embodiment, the density of each of the grooves 86 increases as the grooves are separated from the light-emitting elements 89. Therefore, the distribution of the intensity of illuminating light emitted from the light guide plate 80 is uniform regardless of the distance from the light-emitting elements 89.

In the lower plate section 45 of the third frame 40, a step is partially formed in a region overlapped on the side on which the side end surface 801 of the light guide plate 80 is located such that a gap can be obtained between the lower surface 80*c* of the light guide plate 80 and the third frame 40, and the step is curved toward the light guide plate 80. Therefore, reflection sheet 187 and the lower plate section 61 of the light source supporting member 60 can be interposed in the gap formed between the lower surface 80*c* of the light guide plate 80 and the lower plate section 45. In addition, since a concave portion is formed on the rear surface side of the third frame 40 because the lower plate section 45 of the third frame 40 is partially curved toward the light guide plate 80, the flexible wiring substrate 200 is curved and extended to the lower surface (rear surface) of the lower plate section 45 of the third frame 40 and the circuit substrate 250 is arranged in the concave portion such that the circuit substrate 250 is placed within the depth of the concave portion. Therefore, the lighting system 8 can be thin.

In the first embodiment, each of the light source substrates 88 is arranged such that one surface 881 on which the light-emitting elements 89 are mounted face the light incidence section 80*a* of the light guide plate 80. In addition, the light source substrate 88 has a configuration in which a wiring pattern and a land is provided together with an insulation layer on the side of the one surface 881 of the planner metallic plate 887 (support plate) which extends along the light incidence section 80*a*. The configuration can be implemented by bonding the flexible wiring substrate 888, on which a resin base material layer, the wiring pattern, an insulation protective layer and the like are laminated in this order, to the side of the one surface 881 of the metallic plate 887. Therefore, the land on which a chip including the wiring pattern and the light-emitting elements 89 is mounted is electrically insulated from the metallic plate 887. In the first embodiment, the metallic plate 887 is formed of an aluminum plate, and the metallic plate 887 secures the mechanical strength of the light source substrate 88 and functions as a heat radiation plate for heat generated by the light-emitting elements 89.

As shown in FIGS. 3, 4A, 5A, 6A and 6B, on the side of the other surface 882 of each of the two light source substrates 88, each light source supporting member 60 for holding the light source substrate 88 is arranged. The light source supporting member 60 is arranged and held between the third frame 40 and the first frame 30. In the first embodiment, the light source supporting member 60 is a rod-shaped metallic part which extends along the other surface 882 of the light source substrate 88. The light source supporting member 60 includes a lower plate section 61 which is overlapped on the lower plate section 45 of the third frame 40, and a substrate support plate section 62 which configures a wall surface which protrudes from the intermediate position in the width direction of the lower plate section 61 to the upper direction. In addition, the light source supporting member 60 includes an upper plate section 63 on the upper end side (the side which is opposite the lower plate section 61) of the substrate support plate section 62. The upper plated section 63 is curved from the substrate support plate section 62 in the side which is opposite the side on which the light guide plate 80 is located. The upper plate section 63 is fixed on any one of the upper plate section 55 of the second frame 50 and the upper plate sections 315 and 325 of the first frame 30 using a screw or the like.

In the light source supporting member 60 having the configuration, the side surface of the side of the substrate support plate section 62, on which the light guide plate 80 is located, is a substrate holding surface 620 which holds the light source substrate 88. In the first embodiment, the light source substrate 88 is fixed to the substrate holding surface 620 using a screw or the like. In this state, the entire surface of the other surface 882 (metallic plate 887) of the light source substrate 88 abuts against the substrate holding surface 620, that is, tightly attached to the substrate holding surface 620. In addition, the light source supporting member 60 is made of metal, such as aluminum, ferrous metals or the like. Therefore, heat generated by the light-emitting elements 89 is transmitted from the metallic plate 887 of the light source substrate 88 to the light source supporting member 60, and heat of the light source supporting member 60 is transmitted to the third frame 40. Therefore, it is possible to suppress the rise in the temperature of the light-emitting elements 89.

Fixed Structure of Liquid Crystal Panel 10 and Optical Sheet 180

Referring to FIGS. 1A to 6B, the fixed structure of the liquid crystal panel 10 and the optical sheet 180 of the liquid crystal display apparatus 100 will be described. In the liquid crystal display apparatus 100 according to the first embodiment, the second frame 50, the first frame 30, and the third frame 40 are coupled using screws (not shown in the drawing) or the like, and the liquid crystal panel 10 and the lighting system 8 are holed therein. In further detail, the end portion of the liquid crystal panel 10 is held between the protruded plate sections 312, 322, 332, and 342 of the first frame 30 and the upper plate section 55 of the second frame 50. In addition, the end portion of the reflection sheet 187, the light guide plate 80, the optical sheet 180 (the diffusion sheet 182, the prism sheets 183 and 184, and the like) are interposed between the protruded plate sections 312, 322, 332, and 342 of the first frame 30 and the lower plate section 45 of the third frame 40. Therefore, the optical sheet 180 is interposed between the protruded plate sections 312, 322, 332, and 342 of the first frame 30 and the light guide plate 80. Here, a flexible sheet 91 is bonded to the lower surfaces of the protruded plate sections 312 and 322 of the first frame 30. In addition, a flexible sheet 92 is bonded to the upper surface of the protruded plate sections 312, 322, 332, and 342 of the first frame 30. Therefore, when the liquid crystal display apparatus 100 is assembled, the liquid crystal panel 10 is supported by the protruded plate sections 312, 322, 332, and 342 using the flexible sheet 92. In addition, when the liquid crystal display apparatus 100 is assembled, the lighting system 8 is supported using the flexible sheet 91. In addition, when the liquid crystal display apparatus 100 is assembled, the optical sheet 180 (the diffusion sheet 182, the prism sheets 183 and 184, and the like) of the lighting system 8 is suppressed using the flexible sheet 91 such that the optical sheet is not floated and the positional aberration thereof is not generated.

In this way, the lighting system 8 and the liquid crystal panel 10 are held by the first frame 30, the second frame 50, and the third frame 40, so that the first stage section 313, which protrudes from the protruded plate section 312 to the side of the liquid crystal panel 10, is formed on the frame plate (first frame portion) 31 of the first frame 30 of the side (the side 10a) where the protruded section 110 of the liquid crystal panel 10 is located. The first stage section (first surface) 313 faces the side end surface (side 10a) of the side of the protruded section 110 of the device substrate 11 which is used for the liquid crystal panel 10 and the other side end surface of the device substrate 11. In the first embodiment, the first stage section (first surface) 313 faces the edge (side 10a) of the liquid crystal panel 10 through a narrow gap Ga (refer to FIG. 4B).

In addition, the second stage section (second surface) 316, which protrudes from the protruded plate section 312 toward the thickness direction (one side z1 of the Z-axis direction) of the optical sheet 180, is formed on the frame plate (first frame portion) 31 of the first frame 30. The second stage section (second surface) 316 faces the outline side 181 (external edge) of the optical sheet 180. Here, the second stage section (second surface) 316 is located further to the inner side (the side of the image display region 100a) than the first stage section (first surface) 313. In addition, the second stage section (second surface) 316 faces the outline side 181 of the optical sheet 180 through a narrow gap Gb (refer to FIG. 4B). Therefore, the outline side 181 of the optical sheet 180 is located more considerably inside than the outer end surface (side 10a) of the side of the protruded section 110 of the device substrate 11 and the other side end surface of the device substrate 11. In addition, the second stage section (second surface) 316 is located more inner side than the side end surface 801 (the side of the image display region 100a) of the light guide plate 80, and the outline side 181 of the optical sheet 180 is located further to the inner side than the side end surface 801 of the light guide plate 80. Therefore, the end portion of the optical sheet 180 is arranged to be interposed between the protruded plate section 312 and the light guide plate 80. In addition, the outline side 181 of the optical sheet 180 is arranged at a position which is overlapped on the end portion of the counter substrate 12. In addition, the inner edge 318 of the protruded plate section 312 is located further to the inner side (the side of the image display region 100a) than the seal material 14, and overlapped on the picture frame layer 120 when viewed from plane. In addition, the protruded plate section 312 forms the second stage section (second surface) 316, so that the thickness of protruded plate section 312 of the front end side of the second stage section (second surface) 316 is smaller than the part between the first stage section (first surface) 313 and the second stage section (second surface) 316. Meanwhile, the positions of the second stage section (second surface) 316 and the outline side 181 of the optical sheet 180 can be appropriately set between the position which is overlapped on the seal material 14 and the inner edge 318 of the protruded plate section 312.

In addition, in the first embodiment, as shown in FIG. 5A, like the side (side 10a) on which the protruded section 110 of the liquid crystal panel 10 is located, even on the side (side 10b) which is opposite the side on which the protruded section 110 of the liquid crystal panel 10 is located, the first stage section (first surface) 323, which protrudes from the protruded plate section 322 to the side of the thickness direction (the other side Z2 of the Z-axis direction) of the liquid crystal panel 10, is formed on the frame plate (first frame portion) 32 of the first frame 30. The first stage section (first surface) 323 faces the edge (side 10b) of the liquid crystal panel 10 and the side end surface of the device substrate 11. In the first embodiment, the first stage section (first surface) 323 faces the edge (side 10b) of the liquid crystal panel 10 through the narrow gap Ga (refer to FIG. 5B).

In addition, on the frame plate (first frame portion) 32 of the first frame 30, the second stage section (second surface) 326, which protrudes from the protruded plate section 322 toward the thickness direction (one side Z1 of the Z-axis direction) of the optical sheet 180, is formed. The second stage section (second surface) 326 faces the outline side 181 of the optical sheet 180. Here, the second stage section (second surface) 326 is located further to the inner side (the side of the image display region 100a) than the first stage section (first surface) 323. Therefore, the end portion of the optical sheet 180 is arranged to be interposed between the protruded plate section 322 and the light guide plate 80. In addition, the second stage section (second surface) 326 faces the outline side 181 of the optical sheet 180 through the narrow gap Gb (refer to FIG. 53). In this state, the second stage section (second surface) 326 is located further to the inner side (the side of the image display region 100a) than the side end surface 802 of the light guide plate 80, and the outline side 181 of the optical sheet 180 is located further to the inner side than the side end surface 802 of the light guide plate 80. In addition, the outline side 181 of the optical sheet 180 is arranged at a position where is overlapped on the end portion of the counter substrate 12. In addition, the inner edge 328 of the protruded plate section 322 is located further to the inner side (the side of the image display region 100a) than the seal material 14, and overlapped on the picture frame layer 120 when viewed from the plane. In addition, the protruded plate section 322 forms the second stage section (second surface) 326, so that the thickness of protruded plate section 322 of the front end side of the second stage section (second surface) 326 is smaller than the part between the first stage section (first surface) 323 and the second stage section (second surface) 326.

Meanwhile, among the sides 10a, 10b, 10c, and 10d of the liquid crystal panel 10, the sides 10c and 10d in which the light-emitting elements 89 are not arranged have substantially the same configuration as the configuration described with reference to FIGS. 5A and 5B.

Main Effects of First Embodiment

As described above, in the liquid crystal display apparatus 100 according to the first embodiment, the side of the device substrate 11, on which the protruded section 110 which protrudes from the end portion of the counter substrate 12 is located, is provided with the first stage section (first surface) 313, which protrudes from the protruded plate section 312 of the first frame 30 toward the side of the liquid crystal panel 10 and faces the side end surface of the protruded section 110. Therefore, even when an impact is applied to the liquid crystal panel 10 by external force, the liquid crystal panel 10 merely abuts against the adjacent first stage section (first surface) 313 and is not heavily struck on the periphery. Therefore, even though the side on which the protruded section 110 is located is not a panel structure, it is possible to prevent the device substrate 11 from being distorted, prevent image irregularity from being generated, and prevent damage to the device substrate 11 from being generated. In addition, the side, where the protruded section 110 is located, is provided with the second stage section (second surface) 316 which protrudes from the protruded plate section 312 of the first frame 30 to the optical sheet 180 and faces the outline side 181 of the optical sheet 180. Therefore, even when the positional aberration of the optical sheet 180 might be generated due to external force, the optical sheet 180 abuts against the adjacent second stage section (second surface) 316, and the position thereof is not changed any further. Therefore, it is possible to prevent the optical sheet 180 from being distorted and prevent image irregularity from being generated. In addition, even when the positional aberration of the optical sheet 180 might be generated, the optical sheet 180 abuts against the second stage section (second surface) 316, so that the position thereof is not changed any further. Therefore, even when the second stage section (second surface) 316 is arranged on more inner side than the first stage section (first surface) 313 and the size of the optical sheet 180 is reduced, there is not a case where light is incident upon the liquid crystal panel 10 without passing through the optical sheet 180.

In addition, on the side on which the protruded section 110 is located, the gap Gb is provided between the optical sheet 180 and the second stage section (second surface) 316. Therefore, the variation in the position of the outline side 181 of the optical sheet 180 is permitted to some extent, so that it is possible to prevent the optical sheet 180 from being bent.

In addition, the gap Ga is provided between the side end surface of the protruded section 110 (the side end surface of the device substrate 11) and the first stage section (first surface) 313. Therefore, even when shocks or stress is applied to the first frame 30, a large amount of load is not applied to the liquid crystal panel 10, so that it is possible to prevent the device substrate 11 from being distorted, prevent image irregularity from being generated, and prevent the device substrate from being damaged.

In addition, on the side on which the protruded section 110 is located, the second stage section (second surface) 316 is located further to the inner side than the side end surface 801 of the light guide plate 80. Therefore, the size of the optical sheet 180 is small. In addition, on the side on which the protruded section 110 is located, the position of the outline side 181 of the optical sheet 180 is overlapped on the end portion of the counter substrate 12, so that the size of the optical sheet 180 is small. Therefore, it is possible to reduce the costs.

In addition, in the first embodiment, on the side on which the protruded section 110 is located, the inner edge 318 of the protruded plate section 312 is located further to the inner side than the seal material 14. According to this configuration, the width of the protruded plate section 312 is large, so that it is possible to reliably hold the liquid crystal panel 10 and the optical sheet 180.

In addition, the other sides of the liquid crystal panel 10 (sides 10b, 10c, and 10d) have the same structure, so that it is possible to prevent the positional aberrations of the liquid crystal panel 10 and the optical sheet 180 from being generated and it is possible to reduce the optical sheet 180 to a minimum size.

Second Embodiment

The above-described first embodiment has the configuration in which the one surface 881 of the light source substrate 88 faces the light incidence section 80a of the light guide plate 80. However, the invention may be applied to the liquid crystal display apparatus 100 which has a configuration in which the one surface 881 of the light source substrate 88 is perpendicular to the light incidence section 80a of the light guide plate 80.

Another Embodiment

Figure 7A:
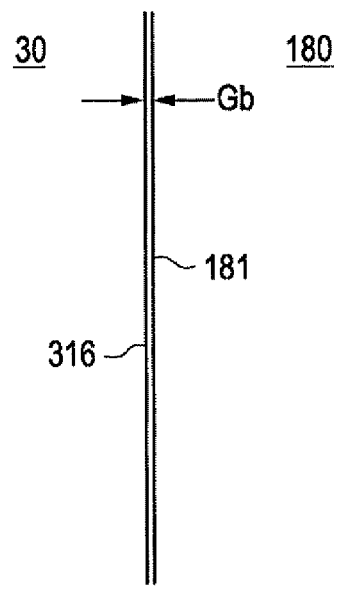
FIGS. 7A to 7D are explanatory views illustrating the planar figures of the outline sides of the optical sheet and a second stage section (second surface) used in the lighting system of the liquid crystal display apparatus to which the invention is applied.
Figure 7C:
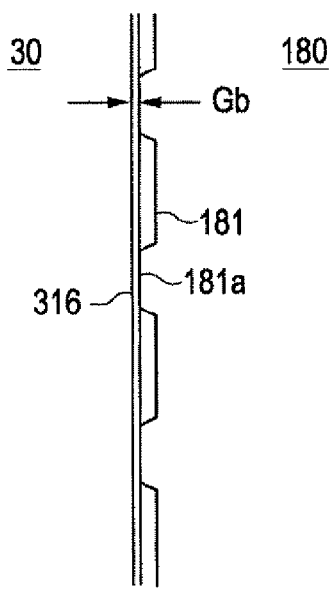
Figure 7B:
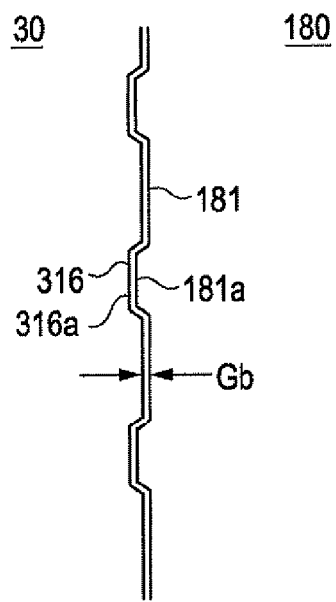
Figure 7D:
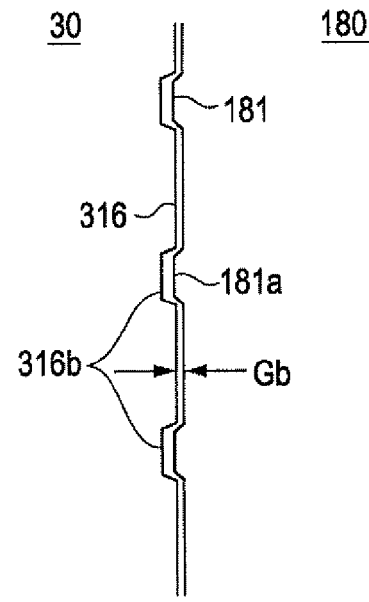

FIGS. 7A to 7D are explanatory views illustrating the planar figures of the outline sides of the optical sheet and the second stage section used in the lighting system of the liquid crystal display apparatus to which the invention is applied. As shown in FIGS. 3 and 7A, in the above-described embodiments, the outline side 181 of the optical sheet 180 is extended in a linear manner, so that the second stage section (second surface) 316 is extended in a linear manner while being separated from the outline side 181 of the optical sheet 180 by the gap Gb. However, when the convex section 181a is provided on the outline side 181 of the optical sheet 180 as shown in FIG. 7B, it is preferable that the second stage section (second surface) 316 be provided with a concave portion 316a at a position corresponding to the convex section 181a such that the concave portion 316a is separated from the outline side 181 of the optical sheet 180 by the gap Gb. In addition, even when the convex section 181a is provided on the outline side 181 of the optical sheet 180 as shown in FIG. 7C, the configuration in which the second stage section (second surface) 316 is extended in a linear manner may be used. In this case, the configuration is made such that the convex section 181a of the optical sheet 180 faces the second stage section (second surface) 316 while the convex section 181a of the optical sheet 180 is separated from the second stage section (second surface) 316 by the gap Gb. In addition, when the outline side 181 of the optical sheet 180 is provided with the convex section 181a as shown in FIG. 7D, a configuration may be used in which the concave portion 316b is provided on the second stage section (second surface) 316 at the position corresponding to the convex section 181a. Therefore, at only portions excluding the convex section 181a, the outline side 181 of the optical sheet 180 faces the second stage section (second surface) 316 while the outline side 181 of the optical sheet 180 is separated from the second stage section (second surface) 316 by the gap Gb.

In the above-described embodiments, both the side of the side end surface 801 of the light guide plate 80 and the side of the side end surface 802 of the light guide plate 80 are used as the light incidence sections 80a. However, the invention may be applied to the liquid crystal display apparatus 100 in which only one of the side end surfaces 801 and 802 is the light incidence section 80a.

In the above-described embodiments, the inner edges 318 and 328 of the protruded plate sections 312 and 322 are overlapped on the picture frame layer 120 when viewed from plane. However, a configuration in which the inner edges of the protruded plate sections 312, 322, 332, and 342 are overlapped on the inner edges of the picture frame layer 120 when viewed from the plane or a configuration in which the inner edges of the protruded plate sections 312, 322, 332, and 342 are located further to the inner side than the inner edges of the picture frame layer 120 may be used, so that the inner edges of the protruded plate sections 312, 322, 332, and 342 may be used as boarders.

In the above-described embodiments, the outline side 181 of the optical sheet 180 is located at the position which is overlapped on the end portion of the counter substrate 12. However, a configuration in which the outline side 181 of the optical sheet 180 is located further to the inner side than the end portion of the counter substrate 12 may be used.

Example on which Liquid Crystal Display Apparatus is Mounted on Electronic Equipment In the above-described embodiments, a liquid crystal TV is illustrated as an example of the electronic equipment 2000 on which the liquid crystal display apparatus 100 is mounted. However, in addition to the liquid crystal TV, the liquid crystal display apparatus 100, in which the invention is applied to the display unit of electronic equipment, such as the display of a personal computer, a digital signage, a car navigation apparatus, a personal digital assistant, or the like, may be used.

The entire disclosure of Japanese Patent Application No. 2011-170779, filed Aug. 4, 2011 is expressly incorporated by reference herein.

What is claimed is:

1. A liquid crystal display apparatus comprising:
    a liquid crystal panel which includes a device substrate, a counter substrate arranged to face the device substrate, a frame-shaped seal material configured to bond the device substrate to the counter substrate, a liquid crystal layer interposed between the device substrate and the counter substrate in a region surrounded by the frame-shaped seal material, and a protruded section in which the device substrate protrudes from an end portion of the counter substrate;
    a lighting system which includes an optical sheet arranged to be overlapped on a side which is opposite a light emission side of the liquid crystal panel; and
    a first frame portion which supports an edge of the protruded section of the liquid crystal panel and includes a protruded plate section that protrudes between the protruded section of the liquid crystal panel and the optical sheet,
    wherein the first frame portion is provided with a first surface as a first stage section which faces a side end surface of the device substrate and with a second surface as a second stage section which is arranged between an edge of the protruded plate section and the first stage section in a plane view from a normal direction of a surface of the liquid crystal panel and which faces an outline side of the optical sheet.

2. The liquid crystal display apparatus according to claim 1,
    wherein the first frame portion is a part of a frame which supports edges of the liquid crystal panel.

3. The liquid crystal display apparatus according to claim 2,
    wherein the lighting system includes;
    a light guide plate arranged to be overlapped on a side which is opposite the liquid crystal panel with respect to the optical sheet, and configured to include at least a part of a region of the light guide plate which is overlapped on the protruded plate section in the plane view from the normal direction of the surface of the liquid crystal panel and which is abutted against the first frame portion; and
    light-emitting elements arranged along at least a side end surface of the light guide plate.

4. The liquid crystal display apparatus according to claim 3,
    wherein the second stage section is located between the side end surface of the light guide plate and the edge of the protruded plate section in the plane view from the normal direction of the surface of the liquid crystal panel.

5. The liquid crystal display apparatus according to claim 3,
wherein the liquid crystal panel is interposed between a second frame, arranged on a side which is opposite the protruded plate section with respect to the liquid crystal panel, and the protruded plate section, and
wherein the optical sheet is interposed between the light guide plate and the protruded plate section.

6. The liquid crystal display apparatus according to claim 1,
wherein, on the side, on which the protruded section is located, an outline side of the optical sheet is located at a position which is overlapped on a side end surface of the counter substrate, or located further to an inner side of the counter substrate than the side end surface of the counter substrate in the plane view from the normal direction of the surface of the liquid crystal panel.

7. The liquid crystal display apparatus according to claim 1,
wherein, on the side, on which the protruded section is located, the edge of the protruded plate section is located further to an inner side of the liquid crystal panel than the frame-shaped seal material in the plane view from the normal direction of the surface of the liquid crystal panel.

8. The liquid crystal display apparatus according to claim 1,
wherein, on the side, on which the protruded section is located, a gap is provided between an outline side of the optical sheet and the second surface as the second stage section.

9. The liquid crystal display apparatus according to claim 1,
wherein a gap is provided between the side end surface of the device substrate and the first surface as the first stage section.

10. An electronic equipment comprising the liquid crystal display apparatus according to claim 1.

* * * * *